United States Patent [19]

Kasai et al.

[11] Patent Number: 5,133,316
[45] Date of Patent: Jul. 28, 1992

[54] ENGINE CYLINDER HEAD COVER AND MOLDING COMPOSITION USED THEREFOR

[75] Inventors: Michio Kasai; Rikio Yonaiyama, both of Chiba; Hirotoshi Fujikawa, Osaka; Hidetoshi Ishihara, Aichi; Joji Kasugai, Aichi; Junji Koizumi, Aichi, all of Japan

[73] Assignees: Chisso Corporation; Daihatsu Motor Co., Ltd.; Toyoda Gosei Co., Ltd., Japan

[21] Appl. No.: 702,429

[22] Filed: May 20, 1991

[30] Foreign Application Priority Data

May 22, 1990 [JP] Japan .................. 2-130311

[51] Int. Cl.⁵ ............................ F02B 77/00
[52] U.S. Cl. .................... 123/198 E; 524/449; 525/404
[58] Field of Search .............. 123/195 C, 198 E; 525/66, 404; 524/449, 494, 514

[56] References Cited

U.S. PATENT DOCUMENTS

| | | | |
|---|---|---|---|
| 4,048,366 | 9/1977 | Kingsbury | 123/198 E |
| 4,447,493 | 5/1984 | Driscoll et al. | 123/198 E |
| 4,707,528 | 11/1987 | Koizumi et al. | 525/404 |
| 4,806,586 | 2/1989 | Nakai | 524/449 |
| 4,874,809 | 10/1989 | Keep | 524/449 |
| 4,880,865 | 11/1989 | George | 524/449 |
| 4,980,407 | 12/1990 | Okumoto et al. | 524/449 |
| 4,983,647 | 1/1991 | Ueno et al. | 524/449 |
| 4,994,518 | 2/1991 | Morin et al. | 524/449 |

Primary Examiner—Noah P. Kamen
Attorney, Agent, or Firm—Leydig, Voit & Mayer

[57] ABSTRACT

The present invention provides a cylinder head cover for an internal combustion engine having excellent vibration-damping properties which is prepared by molding a composition comprising 75 to 30% by weight, based on the composition, of resin components comprising 50 to 80% by weight of a polyamide resin and 50 to 20% by weight of a modified polyolefin resin modified with an unsaturated acid or its derivative, the total of both the resins being 100% by weight, 15 to 30% by weight of glass fibers based on the composition, and 10 to 40% by weight of mica based on the composition.

18 Claims, 4 Drawing Sheets

ENGINE CYLINDER HEAD COVER AND MOLDING COMPOSITION USED THEREFOR

BACKGROUND OF THE INVENTION (i) Field of the Invention

The present invention relates to a cylinder head cover for an internal combustion engine which comprises a composition containing a resin component including a polyamide resin and a modified polyolefin resin, glass fibers and mica and which is excellent in vibration-damping properties in a wide temperature range of from ordinary temperature to high temperature(60°-100° C.) and which has dimensional stability, mechanical strength and heat resistance.

(ii) Description of the Related Art

Recently, in the field of automobiles, there is a noticeable tendency that the cost of fuel is decreased by light-weight design and parts made of resins are employed for cost reduction in place of metal parts.

Above all, a molded article of a glass fiber-reinforced polyamide resin has been used in place of metal parts in the engine compartment such as a cylinder head cover, since this kind of resin article is excellent in mechanical strength and heat resistance.

However, in the molded articles of glass fiber-reinforced polyamide resin in which glass fibers are only blended with a polyamide resin, mechanical properties and heat distortion resistance are improved, but deformation would occur owing to a molding shrinkage difference attributed to the orientation of the glass fibers at the time of molding. In other words, this kind of resin article has the drawback that dimensional stability is poor.

In order to improve the dimensional stability, polyamide resin compositions for engine peripheral parts such as cylinder head cover have been suggested in which glass fibers and an inorganic filler are blended with a specific polyamide resin (Japanese Patent Application Laid-open Nos. 63-168454 and 63-168456). In such polyamide resin compositions, the dimensional stability of the molded articles owing to the deformation at the time of the molding can be improved, but when the molded articles absorb water, their dimensional stability is poor and resistance to antifreeze agents is also poor. In consequence, these kinds of resin compositions are not always satisfactory. As a cylinder head cover for automobiles in which the above-mentioned disadvantages are eliminated, a cylinder head cover for automobiles has been suggested which can be obtained by molding a composition prepared by blending a mixture of a conventional known polyamide resin and a specific high-grade polyamide resin with glass fibers and an inorganic filler (Japanese Patent Application Laid-open No. 63-289063).

However, this cylinder head cover for automobiles is expensive, since a high-grade polyamide resin is used.

In addition, with regard to engine peripheral parts such as a cylinder head cover made of the conventional known composition, the problem of vibration-damping properties which has a noise reduction means is not yet been solved.

SUMMARY OF THE INVENTION

An object of the present invention is to provide a cylinder head cover for an internal combustion engine which is excellent in vibration-damping properties in a wide temperature range of from ordinary temperature to high temperature(60°-100° C.) and in which deformation is substantially imperceptible and dimensional change an the deterioration of physical properties at the time of water absorption are remarkably small.

The present inventors have intensively researched to solve the above-mentioned problems. As a result, much attention has been paid to the fact that a polymer material exerts maximum vibration-damping properties in a temperature range from glass transition point to a transition region in which it is in a rubbery state, and it has been found that when a composition prepared by blending a matrix resin with mica and glass fibers in a specific composition ratio is used, the above-mentioned problems can all be solved, the aforesaid matrix resin being what can be prepared by mutually micro-dispersing a polyolefin resin having a glass transition point in the vicinity of ordinary or ambient temperature and a polyamide resin having a glass transition point of about 80° C., in a specific composition ratio. Based on the above-mentioned knowledge, the present invention has been achieved.

That is, the present invention is directed to a cylinder head cover for an internal combustion engine having excellent vibration-damping properties which is prepared by molding a composition comprising 75 to 30% by weight, based on the total weight of the composition, of resin components comprising 50 to 80% by weight of a polyamide resin and 50 to 20% by weight of a modified polyolefin resin modified with an unsaturated acid or its derivative, the total of both the resins being 100% by weight; 15 to 30% by weight of glass fibers based on the total weight of the composition; and 10 to 40% by weight of a mica based on the composition.

DESCRIPTION OF PREFERRED EMBODIMENTS

Figure 1:
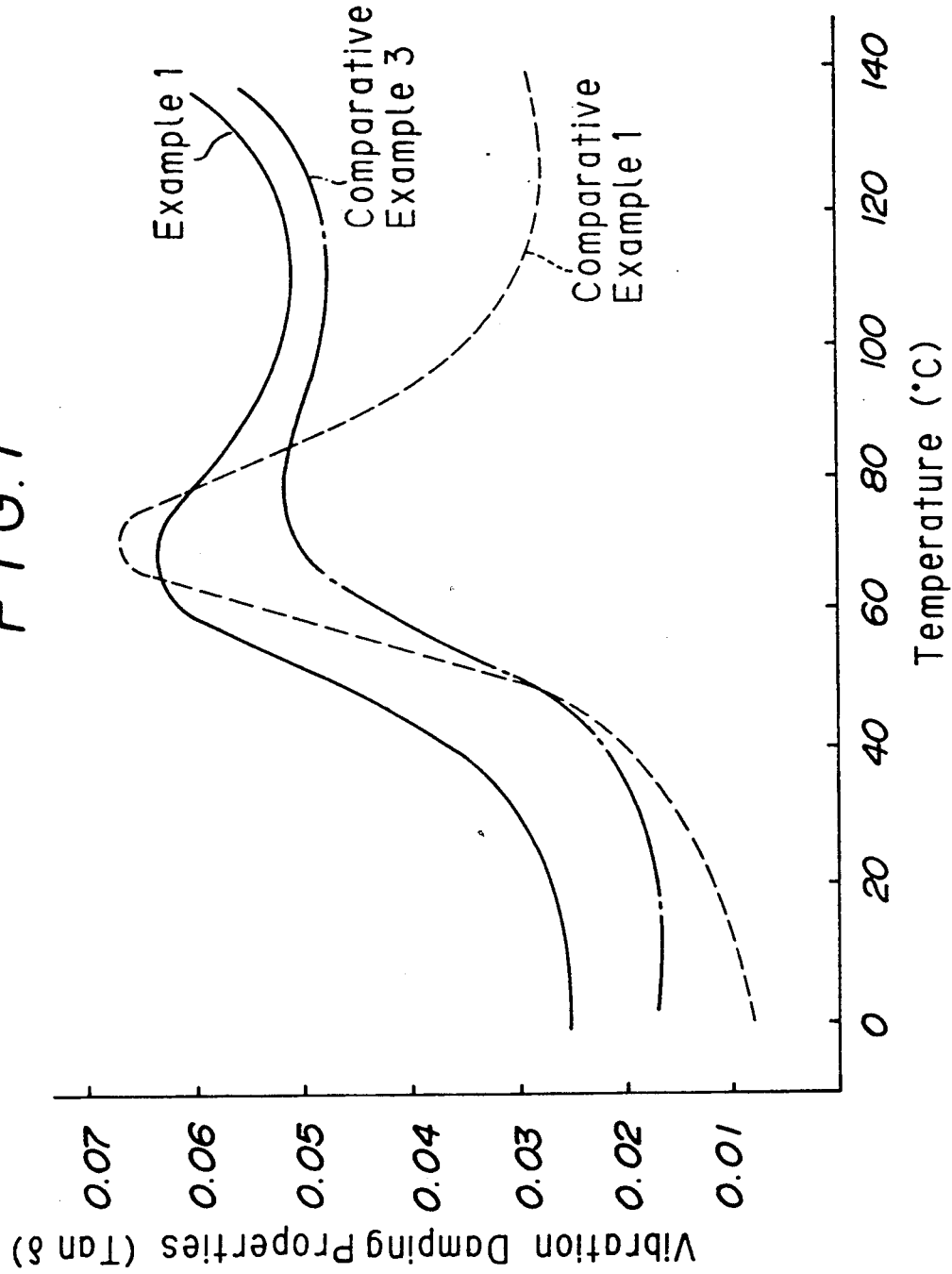
FIG. 1 is a graph illustrating the temperature change of vibration-damping properties(tan $\sigma$) of Example 1 and Comparative Examples 1 and 3.

A cylinder head cover of the present invention is excellent in vibration-damping properties in a wide temperature range of from ordinary temperature to high temperature (60°-100° C.) and which is free from warp deformation and in which there are remarkably suppressed drawbacks of a polyamide, i.e., the deterioration of dimensional stability at the time of the water absorption and physical properties owing to the water absorption.

With regard to the composition concentrations of a polyamide resin and a modified polyolefin resin modified with an unsaturated acid or its derivative which are used as resin components in the present invention, the ratio concentration of the polyamide resin is from 50 to 80% by weight, preferably from 55 to 70% by weight. When the concentration of the polyamide resin is less than 50% by weight, a heat distortion temperature is noticeably reduced, and when it is more than 80% by weight, the vibration-damping properties at ordinary temperature declines and the improvement effects of the dimensional stability at the time of the water absorption and the deterioration of physical properties owing to the water absorption are insufficient.

The concentration of the modified polyolefin resin modified with the unsaturated acid or its derivative is from 50 to 20% by weight, preferably from 45 to 30% by weight. When the concentration of the modified polyolefin resin is less than 20% by weight, the vibration-damping properties at ordinary temperature declines and the improvement effects of the dimensional stability at the time of the water absorption and the deterioration of physical properties owing to the water absorption are insufficient, and when it is more than 50% by weight, the heat distortion temperature is noticeably reduced.

Examples of the polyamide resin used in the present invention include nylon 46 which can be manufactured by the polycondensation of diaminobutane and adipic acid, nylon MXD6 which can be manufactured by the polycondensation of meta-xylenediamine and adipic acid, nylon 6, nylon 66 and mixtures thereof. In particular, nylon 6 and nylon 66 are preferable.

The modified polyolefin resin modified with the unsaturated acid or its derivative which is used in the present invention means a modified polyolefin resin which can be obtained by treating a polyolefin resin with an unsaturated acid or its derivative in the presence of a radical generator under heating conditions. Preferable examples of the unsaturated acid or its derivative include unsaturated carboxylic acids, their anhydrides, for example, acrylic acid, methacrylic acid, maleic acid, phthalic acid, citraconic acid, maleic anhydride and itaconic anhydride. Above all, maleic anhydride is particularly preferable.

Examples of the polyolefin which is used as the raw material for the modified polyolefin resin modified with the unsaturated acid or its derivative include α-olefin resins such as a polyethylene resin, a polypropylene resin, a poly(α-butylene) resin and a poly(α-isobutylene) resin, copolymers of the α-olefins and other α-olefins or vinyl monomers such as alkyl acrylates, alkyl methacrylates such as methyl acrylate, methyl methacrylate, and mixtures of two or more thereof, but in particular, the polypropylene resin is preferable. The treatment of the polyolefin with the unsaturated acid or its derivative under the heating conditions can be achieved by using any known method. Nevertheless, a convenient method can be suitably utilized which comprises the steps of adding the above-mentioned unsaturated acid or its derivative and an organic peroxide such as di-t-butyl peroxide, dicumyl peroxide or benzoyl peroxide as a radical generator to a polyolefin powder, stirring and mixing them by means of a high-intensity mixer or the like, and then melting/kneading and extruding the mixture at a melting/kneading temperature of from 150° to 300° C., preferably from 180° to 250° C. by the use of an extruder.

In addition, as the modified polyolefin resin component of the present invention, there can also be used a mixture of the modified polyolefin resin and an unmodified polyolefin resin in an amount of not more than the weight of the modified polyolefin resin.

The glass fibers used in the present invention are usually glass chopped strands which are manufactured and commercially sold as a reinforcing material for a resin, and each of the preferable strands has an average fiber diameter of from 5 to 20 μm and an average fiber length of from 0.5 to 10 mm.

The amount of the glass fibers to be blended, is from 15 to 30% by weight based on the total weight of the composition. When the amount of the glass fibers is less than 15% by weight, the improvement effects of mechanical strength and heat distortion temperature are insufficient, and when it is more than 30% by weight, the moldability of the composition deteriorates and, the commercial value of the molded articles is impaired.

The mica which is used in the present invention can be selected from the wide range of Biotite mica, Lepidolite mica, Muscovite mica and the Phlogopite mica, and ratio between the average diameter and the average thickness of mica crystalline plates, i.e., average aspect ratio, is preferably 25 or more.

The amount of the mica to be blended is from 10 to 40% by weight based on the total composition. When the amount of the mica is less than 10% by weight, vibration-damping properties and the effect of preventing the molded articles from warping are insufficient, and when it is more than 40% by weight, the appearance of the molded articles deteriorates and their commercial value is impaired.

When the total weight of the glass fibers and the mica to be blended is in excess of 70% by weight, industrial production of the molded articles is difficult, moldability deteriorates extremely, and the commercial value of the molded articles is impaired. Therefore, the total weight of these inorganic fillers to be blended is desirably 70% by weight or less.

The composition of the present invention can be prepared by the following method. That is, (1) a method in which predetermined amounts of a polyamide resin, an unsaturated acid-modified polyolefin resin, glass fibers and a mica are placed in a high-intensity mixer and then stirred and mixed, and the mixture is melted and kneaded at a temperature of from 230° to 300° C., preferably from 230° to 280° C. by the use of a single-screw or twin-screw extruder; or (2) a method in which a mixture prepared by stirring and mixing predetermined amounts of a polyamide resin, an unsaturated acid-modified polyolefin and a mica is fed to an extruder through its usual raw material feed inlet, and after the mixture has been sufficiently melted and kneaded therein, a predetermined amount of glass fibers is fed to the extruder through its midway inlet for another raw material such as the glass fibers, and they are then melted/kneaded and extruded at the above-mentioned temperature.

Furthermore, in the composition of the present invention, various additives can be used together which are, for example, an antioxidant, a metal deactivator, a mold-releasing agent, a pigment and a nucleating agent.

Moreover, the cylinder head cover for an internal combustion engine of the present invention can be obtained by molding the above-mentioned composition of the present invention into a predetermined shape in accordance with an injection molding process.

The cylinder head cover for the internal combustion engine, which is obtained by molding the composition of the present invention, is excellent in vibration-damping properties in a wide temperature range of from ordinary temperature to high temperature (60°-100° C.), is free from warp deformation at the time of molding, and has less dimensional change and less deterioration of physical properties at the time of water absorption.

EXAMPLES

Now, the present invention will be described in detail with reference to examples and comparative examples, but these examples are not intended to limit the present invention.

Figure 3:
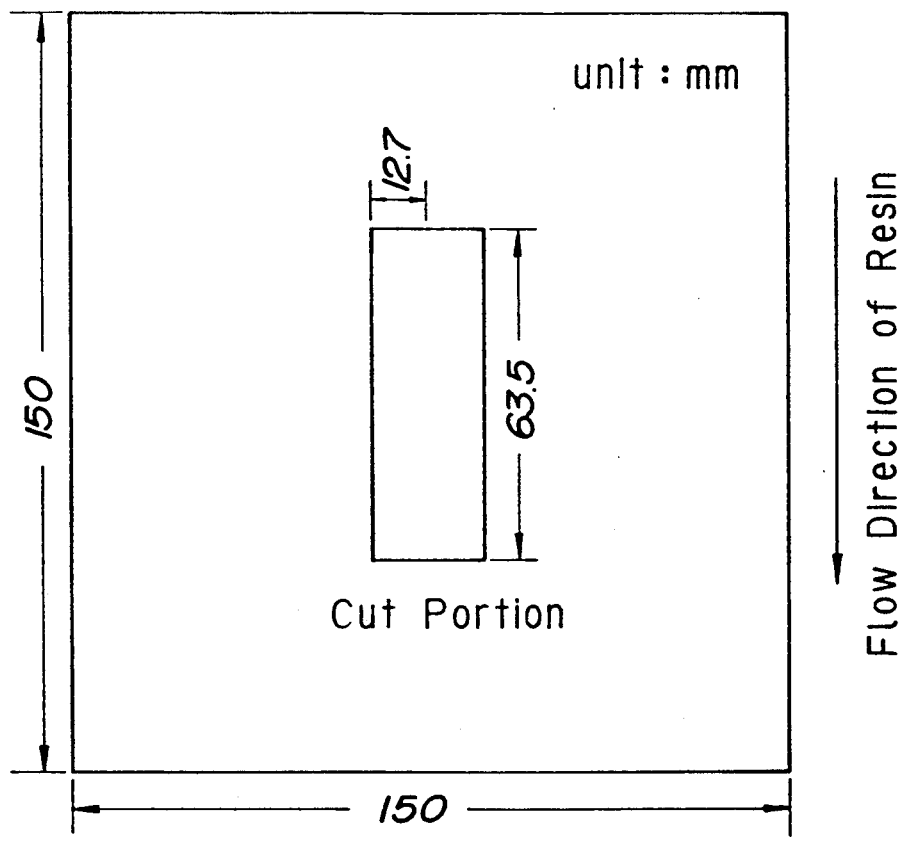
FIG. 3 shows a cut portion of a test piece for vibration-damping properties measurement.
Figure 4:
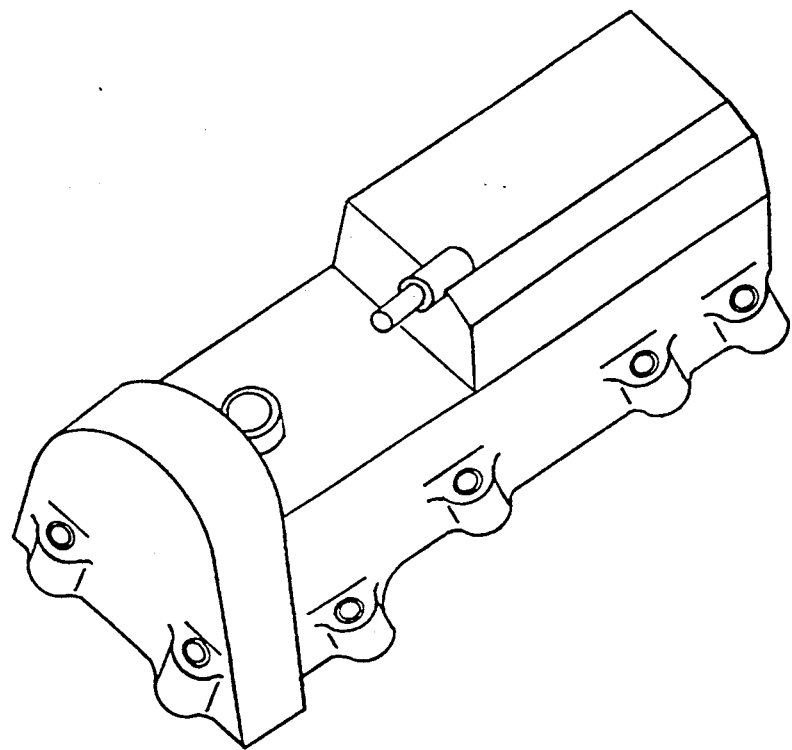
FIG. 4 shows a cylinder head cover using the present composition.

Effects of the present invention were measured as follows:

First, vibration-damping properties, were measured by the following procedure:

A plate having a thickness of 3 mm, a length of 150 mm and a width of 150 mm was injection-molded at a cylinder temperature of 280° C. and at a mold temperature of 80° C., the total face of one side of the plate being provided with a film gate. Afterward, a test piece having a width of 12.7 mm and a length of 63.5 mm was cut at a position shown in FIG. 3 from the plate, and loss modulus and dynamic modulus of this test piece were measured by the use of DYNAMIC MECHANICAL ANALYSIS-983 model made by Du-Pont under conditions that frequency (fixed frequency system; forced vibration non-resonant method) was 5 Hz, amplitude was 0.4 mm, temperature rise rate was 2° C./minute and temperature range for measurement was from 0° C. to 140° C. The vibration-damping properties were calculated from the ratio between the loss modulus and the dynamic modulus, i.e., the temperature dependence of loss tangent.

Mechanical strength was determined by measuring flexural strength (in accordance with JIS 7203); stiffness wa determined by measuring flexural modulus (in accordance with JIS 7203); heat distortion resistance was determined by measuring heat distortion temperature (load 18.6 kg/cm$^2$) (in accordance with JISK 7207); water absorption was determined from the weight increase of a JIS No. 1 tensile test piece after this test piece had been allowed to stand at 50° C. at an RH of 95% for 1000 hours in a constant temperature and constant humidity chamber; dimensional stability at the time of water absorption was determined from a variation of the thickness of the one test piece before and after a water absorption treatment under the same conditions as in the measurement of the water absorption; and warp distortion was determined by measuring the following maximum warp distortion.

Maximum warp distortion: A plate having a thickness of 2 mm, a length of 150 mm and a width of 150 mm was injection-molded, the total face of one side of the plate being provided with a film gate, and the thus molded plate was used as a test piece. This test piece was conditioned at 23° C. at an RH of 50% for 48 hours. Afterward, the test piece was fixed on a parallel base by clamping the opposite ends of one side thereof, and a separate distance (warp) of the opposite side from the parallel surface of the base was measured. The thus measured value was the warp distortion. However, the warp distortion depended upon the fixed position on one side of the test piece, and therefore the test pieces were fixed at positions on the various sides and the warp distortions on the opposite sides were measured. Of these warp distortions, the largest warp distortion was regarded as the maximum warp distortion, and the unit of this maximum warp distortion was mm.

Example 1

In a high-intensity mixer were placed 98.6% by weight of a polypropylene homopolymer having a melt flow rate (a discharge of the melted resin for 10 minutes at 230° C. under a load of 2160 g) of 4.5, 0.5% by weight of maleic anhydride, 0.1% by weight of 2,6-di-t-butylparazol, 0.1% by weight of calcium stearate, 0.1% by weight of 1,3-bis(t-butylperoxyisopropyl)benzene and 0.6% by weight of magnesium hydroxide. They were stirred and mixed for 3 minutes, and the resultant mixture was fed to a twin-screw extruder having a plurality of raw material feed inlet, having a diameter of 45 mm and an L/D of 30 through the usual raw material feed inlet, melted/kneaded at 200° C., and then extruded to obtain modified polypropylene pellets having a melt flow rate of 130.

Afterward, in the high-intensity mixer were placed 25% by weight (40% by weight of the resin components) of the modified polypropylene pellets, 37.5% by weight (60% by weight of the resin components) of nylon 6 (relative viscosity 2.6) and 37.5% by weight of a muscovite mica powder having an aspect ratio of 30, and they were then stirred and mixed for 1 minute. The resultant mixture was fed to the above-mentioned twin-screw extruder through the usual raw material feed inlet, and 20% by weight of glass fibers (chopped strands) having a diameter of 13 $\mu$m and a length of 3 mm was fed to the extruder through another feed inlet disposed in a cylinder portion thereof, while metered. Next, the materials were melted/kneaded and then extruded at a melting/kneading temperature of 250° C. to obtain pellets.

The thus obtained pellets were dried at 100° C. for 2 hours in an air oven, and predetermined test pieces were molded at a cylinder temperature of 280° C. and at a mold temperature of 80° C. by means of an injection molding machine, and then used for various evaluation tests. The results are set forth in Table 1, and vibration-damping properties is shown in FIG. 1.

EXAMPLE 2 AND COMPARATIVE EXAMPLES 1 TO 5

Figure 2:
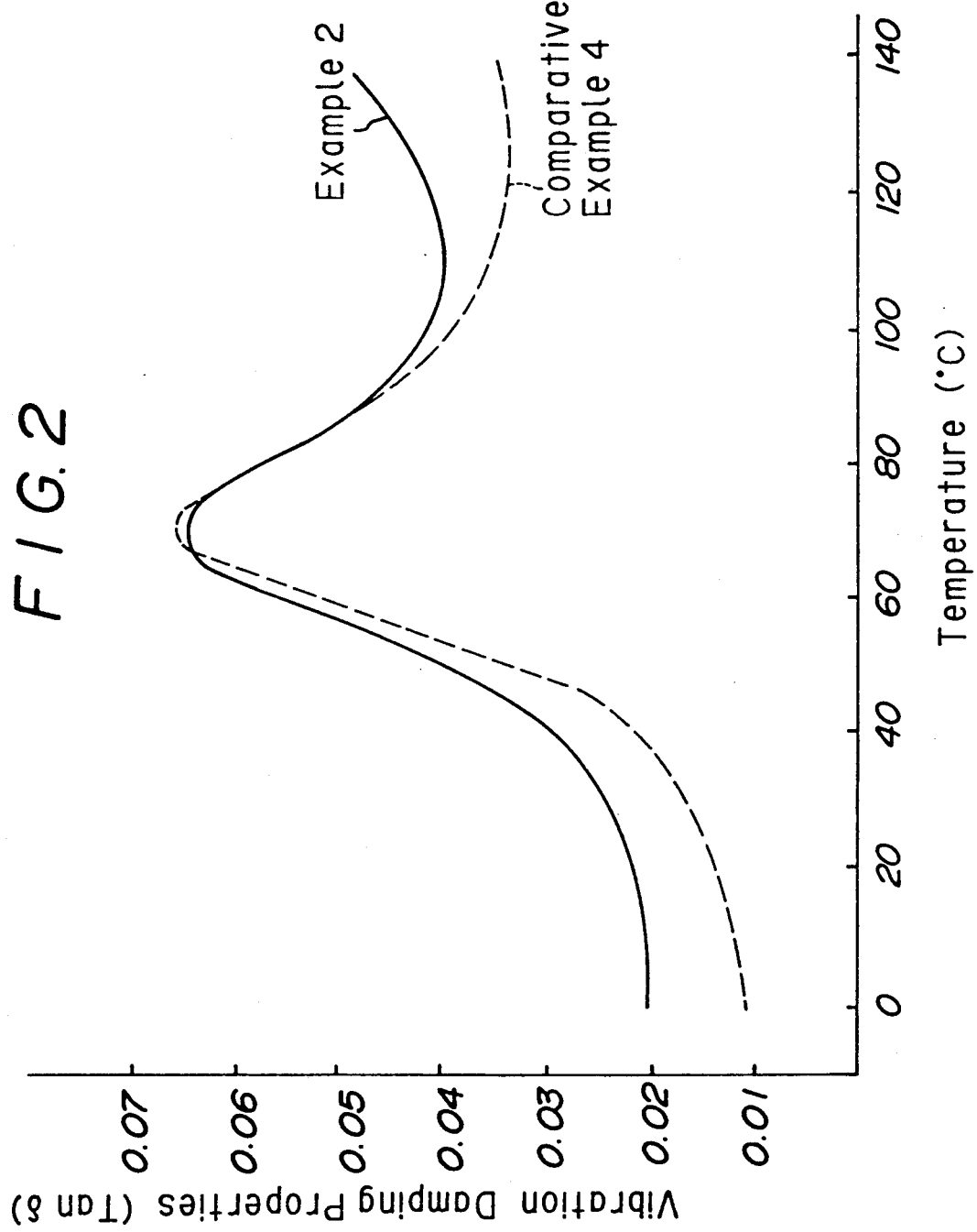
FIG. 2 is a similar graph illustrating the vibration-damping properties of Example 2 and Comparative Example 4.

Melting/kneading was carried out using the same raw materials under the same conditions as in Example 1 except that each composition concentration of the modified polypropylene, the nylon 6, the muscovite mica and the glass fiber was changed, and predetermined test pieces were molded under the same conditions as in Example 1 and then used for various evaluation tests. The results are set forth in Table 1, and vibration-damping properties is shown in FIG. 2.

TABLE 1

|  | Example 1 | Comp. Example 1 | Comp. Example 2 |
|---|---|---|---|
| Composition of Resin Components (wt. %) | | | |
| Nylon 6 | 60.0 | 100.0 | 60.0 |
| Modified Polypropylene | 40.0 | 0.0 | 40.0 |
| Blend Ratio (wt. %) | | | |
| Resin Components | 50.0 | 50.0 | 50.0 |
| Mica | 30.0 | 30.0 | 45.0 |
| Glass Fibers | 20.0 | 20.0 | 5.0 |

TABLE 1-continued

| Physical Properties of Absolute Dry Pieces | | | |
|---|---|---|---|
| Flexural Strength (kg/cm²) | 1900 | 2100 | 1100 |
| Flexural Modulus (kg/cm²) | 114000 | 121000 | 92700 |
| Heat Distortion Temp. (°C.) | 201 | 210 | 168 |
| Warp Distortion (mm) | 0.0 | 0.0 | 0.0 |
| Water Absorption (wt %) | 2.23 | 3.95 | 2.62 |
| Dimensional Change (%) at Water Absorption | 1.25 | 3.57 | 1.67 |

| | Comp. Example 3 | Example 2 | Comp. Example 4 | Comp. Example 5 |
|---|---|---|---|---|
| Composition of Resin Components (wt. %) | | | | |
| Nylon 6 | 60.0 | 70.0 | 85.0 | 35.0 |
| Modified Polypropylene | 40.0 | 30.0 | 15.0 | 65.0 |
| Blend Ratio (wt. %) | | | | |
| Resin Components | 50.0 | 50.0 | 50.0 | 50.0 |
| Mica | 5.0 | 30.0 | 30.0 | 30.0 |
| Glass Fibers | 45.0 | 20.0 | 20.0 | 20.0 |
| Physical Properties at Absolute Dry | | | | |
| Flexural Strength (kg/cm²) | 2320 | 1940 | 2090 | 1320 |
| Flexural Modulus (kg/cm²) | 107000 | 118000 | 119000 | 95600 |
| Heat Distortion Temp. (°C.) | 201 | 206 | 207 | 157 |
| Warp Distortion (mm) | 26.7 | 0.0 | 0.0 | 0.0 |
| Water Absorption (wt %) | 2.16 | 2.73 | 3.84 | 1.29 |
| Dimensional Change (%) at Water Absorption | 1.13 | 2.37 | 3.13 | 1.10 |

As is apparent from Table 1 and FIG. 1, with regard to Example 1 in which the resin components of the present invention were used, vibration-damping properties were fairly excellent in a wide temperature range of from ordinary temperature to high temperature(60°-100° C.), and water absorption and dimensional stability at the time of the water absorption were also largely improved, as compared with Comparative Example 1 in which the same inorganic fillers were used in the same amounts as in Example 1 and 100% by weight of the resin component, nylon 6 was used.

In Comparative Example 2 in which the same resin components as in Example 1 were used and 45% by weight of the mica and 5% by weight of the glass fibers were blended, heat distortion temperature and strength noticeably deteriorated. In Comparative Example 3, 5% by weight of the mica and 45% by weight of the glass fibers were blended, and the vibration-damping properties were improved at ordinary temperature and at higher temperature as compared with Comparative Example 1, but warp distortion at the time of molding noticeably deteriorated.

In Example 2 in which the ratio of the resin component, nylon 6 was increased up to 70% by weight, the vibration-damping properties were excellent in the range of from ordinary temperature to high temperature(60°-100° C.), and the dimensional stability at the time of water absorption was remarkably improved as compared with Comparative Example 4, as shown in FIG. 2.

In Comparative Example 4 in which the ratio of the resin component, nylon 6 was increased to 85% by weight, the vibration-damping properties largely deteriorated in the range of from ordinary temperature to high temperature(60°-100° C.) and the dimensional stability at the time of water absorption noticeably declined as compared with Examples 1 and 2, as shown in FIG. 2.

In Comparative Example 5, the amount of the resin component, the modified polypropylene was increased to 65% by weight, and as a result, the heat distortion temperature noticeably deteriorated.

What is claimed is:

1. A cylinder head cover for an internal combustion engine having excellent vibration-damping properties formed from a composition comprising 75 to 30% by weight, based on the total weight of the composition, of resin components comprising 50 to 80% by weight of a polyamide resin and 50 to 20% by weight of a modified polyolefin resin modified with an unsaturated acid or its derivative, the total of the polyamide resin and all the polyolefin resins being 100% by weight of the resin components, 15 to 30% by weight of glass fibers based on the total weight of the composition, and 10 to 40% by weight of mica based on the total weight of the composition.

2. The cylinder head cover for an internal combustion engine having excellent vibration-damping properties according to claim 1 wherein said modified polyolefin resin is a polypropylene resin modified with an unsaturated acid or its derivative.

3. The cylinder head cover for an internal combustion engine having excellent vibration-damping properties according to claim 2 wherein said polyamide resin is nylon 6 or nylon 66.

4. The cylinder head cover for an internal combustion engine having excellent vibration-damping properties according to claim 1 wherein said polyamide resin is nylon 6 or nylon 66.

5. The cylinder head cover for an internal combustion engine according to claim 1 wherein said polyolefin resin has a glass transition point in the vicinity of ambient temperature.

6. The cylinder head cover for an internal combustion engine according to claim 1 wherein said polyamide resin has a glass transition point of about 80° C.

7. The cylinder head cover according to claim 1 further including unmodified polyolefin resin.

8. A molding composition having excellent vibration-damping properties comprising, based on the total weight of the composition, 75 to 30% of resin components, said resin components comprising 50 to 80% of a polyamide resin and 50 to 20% of a polyolefin resin modified with an unsaturated acid or its derivative, the total of the polyamide resin and all the polyolefin resins being 100% by weight of the resin components and, based on the total weight of the composition, 15 to 30% of glass fibers and 10 to 40% of mica.

9. The molding composition according to claim 8 wherein said polyamide resin is nylon 6 or nylon 66.

10. The molding composition according to claim 8 wherein said polyolefin resin is a modified polypropylene resin modified with an unsaturated acid or its derivative.

11. The molding composition according to claim 10 wherein said polyamide resin is nylon 6 or nylon 66.

12. The molding composition according to claim 10 wherein said polyamide resin has a glass transition point of about 80° C.

13. The molding composition according to claim 8 wherein said polyolefin resin has a glass transition point in the vicinity of ambient temperature.

14. The molding composition according to claim 8 further including unmodified polyolefin resin.

15. A cylinder head cover for an internal combustion engine having excellent vibration-damping properties formed from a composition comprising 75 to 30% by weight, based on the total weight of the composition, of resin components consisting essentially of 50 to 80% by weight of a polyamide resin and 50 to 20% by weight of a modified polyolefin resin modified with an unsaturated acid or its derivative, the total of both the resins being 100% by weight of the resin components, 15 to 30% by weight of glass fibers based on the total weight of the composition, and 10 to 40% by weight of mica based on the total weight of the composition.

16. The cylinder head cover for an internal combustion engine having excellent vibration-damping properties according to claim 15 wherein said modified polyolefin resin is a polypropylene resin modified with an unsaturated acid or its derivative.

17. A molding composition having excellent vibration-damping properties comprising, based on the total weight of the composition, 75 to 30% of resin components, said resin components consisting essentially of 50 to 80% of a polyamide resin and 50 to 20% of a polyolefin resin modified with an unsaturated acid or its derivative, the total of both resins being 100% by weight of the resin components and, based on the total weight of the composition, 15 to 30% of glass fibers and 10 to 40% of mica.

18. The molding composition according to claim 17 wherein said modified polyolefin resin is a modified polypropylene resin obtained by modifying a polypropylene with an unsaturated acid or its derivative.

* * * * *